United States Patent [19]

Ufer et al.

[11] Patent Number: 4,830,810
[45] Date of Patent: May 16, 1989

[54] METHOD OF BLOW MOLDING AND FLUORINATING PLASTIC CONTAINERS

[75] Inventors: Peter Ufer, Ingolstadt; Siegfried Schäper, Wettstetten; Hans-Günther Haldenwanger, Ingolstadt; Ingrid Paulus, Manching, all of Fed. Rep. of Germany

[73] Assignee: Audi AG., Ingolstadt, Fed. Rep. of Germany

[21] Appl. No.: 867,916

[22] Filed: May 29, 1986

[30] Foreign Application Priority Data

Jun. 28, 1985 [DE]  Fed. Rep. of Germany ....... 3523137

[51] Int. Cl.[4] ...................... B29C 49/18; B29C 49/46
[52] U.S. Cl. ..................................... 264/40.1; 264/83; 264/526; 264/529
[58] Field of Search ................ 264/40.3, 83, 523, 529, 264/526, 40.1; 425/151

[56] References Cited

U.S. PATENT DOCUMENTS

| | | | |
|---|---|---|---|
| 2,811,468 | 10/1957 | Joffre . | |
| 3,728,063 | 4/1973 | Langecker | 264/40.3 |
| 3,862,284 | 1/1975 | Dixon et al. | 264/83 |
| 4,097,565 | 6/1978 | Cole et al. | 264/40.3 |
| 4,162,878 | 7/1979 | Puglisi et al. | 425/151 |
| 4,333,905 | 6/1982 | Hestehave et al. | 264/529 |
| 4,394,333 | 7/1983 | Fukushima et al. | 264/83 |
| 4,396,567 | 8/1983 | Rainoille | 264/83 |

FOREIGN PATENT DOCUMENTS

| | | |
|---|---|---|
| 1905094 | 1/1970 | Fed. Rep. of Germany . |
| 2401948 | 11/1974 | Fed. Rep. of Germany . |
| 2644508 | 4/1978 | Fed. Rep. of Germany . |
| 2924797 | 6/1979 | Fed. Rep. of Germany . |

Primary Examiner—Jan H. Silbaugh
Assistant Examiner—Neil M. McCarthy
Attorney, Agent, or Firm—Karl Hormann

[57] ABSTRACT

A novel method of blow molding and fluorinating plastic containers carried out in essentially three steps, including blow molding of the container at a first predetermined pressure in a mechanically locked mold with an inert gas, testing the mold for pressure tightness at a second higher level of pressure with an inert gas, and thereafter introducing a fluorine containing gas into the mold at a third level of pressure.

20 Claims, 2 Drawing Sheets

METHOD OF BLOW MOLDING AND FLUORINATING PLASTIC CONTAINERS

BACKGROUND OF THE INVENTION

The invention relates generally to a novel method of blow molding and fluorinating plastic containers and, more particularly, it relates to a method of fabricating fuel tanks for automotive vehicles which is safe for personnel operating the molding machine and which satisfies modern environmental protection requirements.

It is well known to produce plastic containers by blow molding processes and to impart a substantially impervious skin surface to such containers by treating them with a fluorine containing gas. A preferred material for manufacturing such containers is high-density polyethylene having a density, for instance of from about 0.935 to about 0.965, and a melt index in the range of from about 0.05 to about 5.0. It is also known to treat such containers with a gas containing fluorine in such a manner that fluorine remains in the wall surface of the containers in a quantity of from about 0.01 to about 30 $\mu$g of fluorine per $cm^2$ of wall surface.

Neither the materials from which containers made in accordance with the invention are made (e.g. high density polyethylene, or copolymers thereof, as well as mixtures containing copolymerizable monomers) nor the admixtures of gasses employed for the blow molding process form part of this invention. It is believed that a person of ordinary skill in the art of blow molding automotive fuel tanks is sufficiently familiar with such materials.

Reference may, however, be had to west German Patent No. specification DE-PS 24 01 948, disclosing a method of blow molding containers utilizing pressurized inert gas containing from 0.1 to 10% by volume of fluorine. The method there described, while providing containers shaped to conform to the shape of the mold cavity and having an interior skin surface, as a result of the fluorine in the blow gas, which is substantially impervious to certain volatile fluids, no consideration appears to have been given to the danger resulting from the toxicity and corrosiveness of fluorine. West German Patent specification No. DE-AS 19 95 984, relating to blow molding of automotive fuel tanks from polyethylene blanks in the presence of a fluorine containing blow gas lacks any teaching in respect of precautionary measures in the handling of the toxic and corrosive fluorine. Also, U.S. Pat. No. 2,811,468 and west German Patent specification Nos. DE-PS 26 44 508 and DE-OS 29 24 797 while treating generally methods of blow molding containers in the presence of fluorine gas do not teach anything regarding possible ways of reducing potential dangers resulting from the use of fluorine.

However, when using hydraulically actuated molds in the process of manufacturing containers of the kind here under consideration, there exists an acute risk or potential danger that fluorine may unintentionally escape during opening or closing of the mold, for instance were a container is leaking, or in case of malfunction of the hydraulic closure mechanism.

It is, therefore, a primary object of the present invention to provide a novel method of blow molding plastic containers in the presence of fluorine.

Another object of the invention resides in a method of blow molding fuel containers having a skin surface impervious to liquid fuels such as gasoline or Diesel oil.

A further object of the invention is to provide a method of blow molding fuel tanks which prevents fluorine from escaping a blow mold except when intended.

Yet another object of the invention resides in a novel method of operating a blow mold in the manufacture of fuel tanks made from polyethylene blanks and utilizing fluorine gas for providing a fuel impervious skin surface.

Furthermore, it is an object of the present invention to provide a novel blow molding method for manufacturing automotive fuel tanks which effectively protect personnel operating the mold from potential harm which may otherwise result from the escape of fluorine gas.

SUMMARY OF THE INVENTION

The invention provides for a method of blow molding plastic containers including the steps of inserting a container blank into an open mold, closing the mold, injecting inert gas into the blank at a first level of pressure to expand and conform it to the shape of the mold cavity, raising the pressure within the blank to a level above said first level to determine the pressure tightness of the mold, and injecting fluorine into said blank after its pressure tightness has been determined.

Preferably the mold is hydraulically or pneumatically moved between open and closed positions, and is provided with mechanical latching means for latching it in its closed position.

In a preferred embodiment of the method the blank is expanded at a pressure of from about 1 to about 4 bar, an especially preferred range being about 3 bar.

In a further preferred embodiment pressure tightness of the mold is determined by measuring the pressure within the mold.

As an especially advantageous step in the method of the present invention the effectiveness of the mechanical latching of the mold in its closed position is checked before the injection of fluorine into the expanded blank.

The inert gas used for expanding the blank is preferably pure nitrogen.

Preferably, fluorination takes place with a mixture of nitrogen and fluorine.

In a preferred mixture, fluorine is contained in an amount of about 1%.

In a further preferred practice of the method in accordance with the invention the pressure tightness of the mold is checked at about 3 bar.

In accordance with the invention it is preferred that fluorine gas is injected into the blank at a pressure from about 4 to about 10 bar.

In yet another preferred embodiment of the invention the blank is initially rinsed with pure nitrogen, is then preliminarily injected with nitrogen before insertion into the mold, and is after closure of the mold subjected to at least two consecutive steps of nitrogen injection for its expansion.

The container made in accordance with the method of the invention is subjected to at least one cleansing bath comprising nitrogen or dry air.

Preferrably the container is subjected to fluorine gas for about 30 seconds.

The method in accordance with the invention is preferrably carried out in an interval of about 120 seconds.

BRIEF DESCRIPTION OF THE DRAWINGS

The novel features which are consired characteristic of the invention are set forth with particularity in the appended claims. The invention itself, however, both as to its steps and sequence of operation, together with other objects and advantages thereof, will be best understood from the following description of the illustrated method when read in connection with the accompanying drawings, wherein:

DETAILED DESCRIPTION

Figure 1:
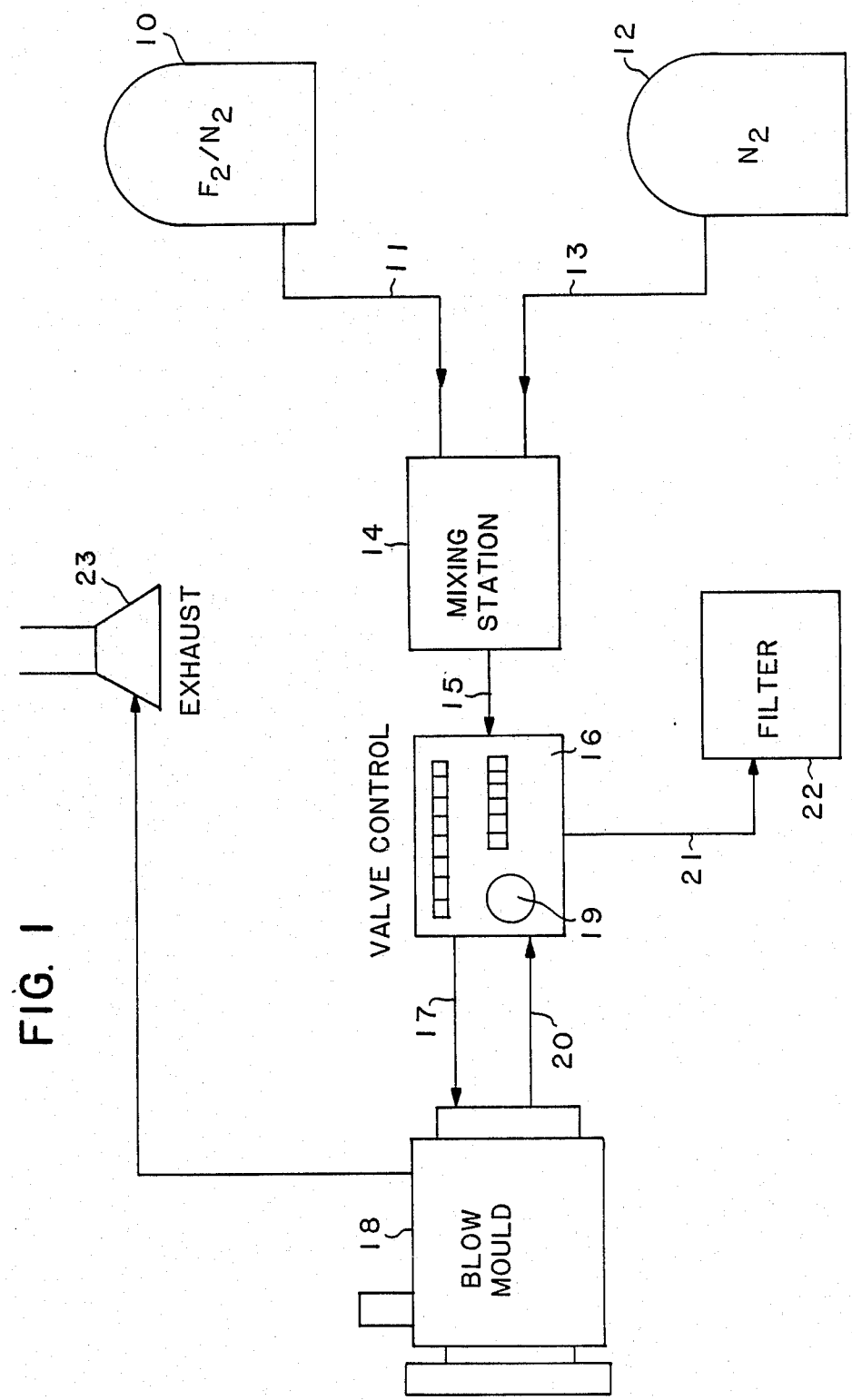
FIG. 1 is a schematic diagram of an apparatus for practicing the method in accordance with the invention.

In FIG. 1 there is schematically shown a first pressure tank 10 for a mixed gas comprising fluorine ($F_2$) and nitrogen ($N_2$) and a second pressure tank 12 for an inert gas, e.g. air or, preferably pure nitrogen ($N_2$). The first tank 10 is connected to a mixing station 14 by way of a duct 11, and the second tank is connected to the same mixing station 14 by way of a duct 13. Valves, well known in the art, may be provided between the tanks 10 and 12 and the mixing station 14, but have not here been shown. In a first step of the method in accordance with the invention the inert gas only is provided to the mixing station 14 from the tank 12, and thence it is conveyed to a mold arrangement 18 by way of ducts 15 and 17. An appropriate valve control console schematically indicated at 16 and provided with an indicator gage 19 may be provided for the control of pressure within the mold 18. The mold 18 may be provided with a manometer (not shown). As soon as the pressure within the mold 18 has reached a level of about 3 bar, the valve (not shown) controlling the feeding of inert gas is shut off.

At this point in time the pressure within the mold 18 is monitored to determine the pressure tightness of the mold 18, and at the same time its mechanical latch is checked to determine whether it is secured. The latch may be of a kind well-known in the art and, for this reason, has not been shown. Needless to say, the latch has to be sufficiently strong to withstand the considerable pressure to which the mold may be subjected as hereinafter set forth in more detail.

Only after it has been determined that the pressure within the mold 18 remains constant may a next step in the method be commenced. Constancy of pressure in the mold is, of course, indicative of the fact that a container blank (not shown) within the mold 18 is not leaking. The next step in the method comprises injection of fluorine gas, or a mixture of gas containing nitrogen and preferably about 1% of fluorine into the mold 18, i.e. into the container therein, so that in a manner well-known in the art the surface skin of the container is rendered impervious to fluids, such as gasoline or Diesel oil.

It will be understood by those skilled in the art that neither the polyethylene composition of the container nor the amount of fluorine present in the gas are critical in the practice of this invention. Amounts deviating from those stated may well be equally as beneficial, as may be pressure levels and operating intervals.

Control of the fluorination step takes place by way of the console 16. Pressure within the mold 18, i.e. within the container inserted therein, may be raised to about 10 bar. The injection of fluorine gas into the container will result in a surface layer in the container of fluorinated polyethylene which possesses the desired impermeability relative to solvents and similar fluids such as automotive fuels.

Preferably the pressure of about 10 bar is maintained for about 30 seconds. Following the fluorination step, the fluorine gas is withdrawn from the container by way of ducts 20 and 21. Duct 20 is shown to connect the mold 18 with the control console 16, and duct 21 leads from the console 16 to a fluorine gas trap or filter 22. While the trap 22 may be of any well-known kind, it preferrably comprises wet limestone which absorbs the fluorine.

Thereafter, the blow mold 18 or the container is repeatedly "rinsed" or cleansed with inert gas, such as dried air or preferrably pure nitrogen from the tank 12. Residual fluorine which upon opening of the mold 18 might otherwise escape may be vented by way of an exhaust apparatus schematically shown at 23.

In this manner the method in accordance with the invention assuredly prevents an unchecked and uncontrolled escaping of fluorine into the environment.

Figure 2:
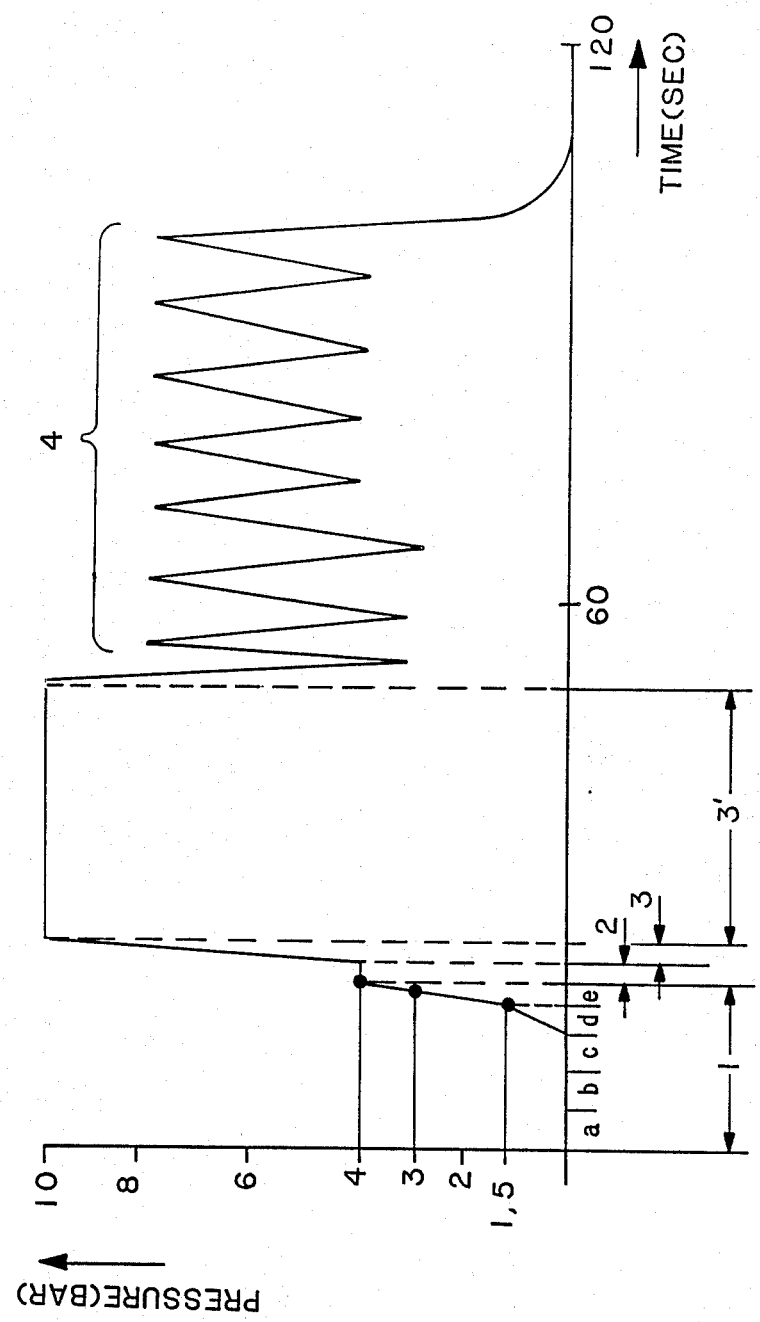
FIG. 2 a flow diagram indicating the pressure during the manufacture of a container in accordance with the method of the invention.

FIG. 2 schematically depicts the pressure sequence over an interval of 120 seconds and identifies the individual steps of the method in accordance with the invention. As shown, and in accordance with a preferred practice of the invention, the safety check, i.e. checking for pressure leaks in the mold or container therein, is carried out at about 3 bar. Injection of the fluorine containing gas commences at about 4 bar.

For convenience, the first step in the practice of the method in accordance with the invention may be subdivided into the following steps:

(a) "rinsing" of the container blank with inert gas, i.e. nitrogen;

(b) initial blow molding of the blank with inert gas;

(c) closing of the mold, including securing of the mechanical latch;

(d) first blow molding step with inert gas (nitrogen); and (e) second blow molding step with inert gas (nitrogen).

The second step thereafter commences by checking the pressure tightness of the system as well as the securing of the latch.

Finally, during the third step pressure within the mold 18, i.e. within the container, is raised to about 10 bar by injection of the fluorine - inert gas mixture. Step 3' indicates maintenance of the pressure at about 10 bar for about 30 seconds. Following step 3', and as indicated by curve 4, repeated "rinsing" or cleansing of the container with pure nitrogen or dried air takes place. As shown, the method is performed within an interval of about 120 seconds.

A container made in accordance with the invention may have a wall thickness of from about 1 to about 3 mm, although other thicknesses may be employed.

It is believed that the method in accordance with the invention provides for an effective way of rendering an otherwise potentially hazardous process harmless to personnel operating the blow molding apparatus, without increasing the cost of the apparatus or the length of conventional manufacturing cycles.

It will be obvious to those skilled in the art that certain changes may be made in the method described above without departing from the scope of the invention. It is therefore intended that all matter herein disclosed be interpreted as illustrative only and not as limiting the scope of protection sought.

What is claimed is:

1. A method of blow molding and fluorinating a plastic container, comprising the steps of:
   inserting a blank of a container into an open mold having a cavity of predetermined shape;
   closing said mold;
   injecting an inert gas into said blank within said closed mold at a first predetermined pressure thereby to expand said blank and conform it to the shape of the cavity of said mold to form the container;
   checking said expanded blank for pressure tightness by monitoring said first predetermined pressure of said inert gas therein for a predetermined interval and thereby determining that
   said first predetermined pressure remains constant and that said expanded blank is not leaking; and, thereafter injecting a fluorine containing gas into said expanded blank at a second predetermined pressure in excess of said first predetermined pressure for a time sufficient to impart impermeability to the interior surface thereof.

2. The method of claim 1, wherein said mold is hydraulically closed and additionally comprises mechanical latching means.

3. The method of claim 2, wherein the step of checking said expanded blank for pressure tightness comprises the step of checking the mechanical latching of said mold.

4. The method of claim 3, wherein said first predetermined pressure is between about 2 and about 4 bar.

5. The method of claim 4, wherein said first predetermined pressure is about 3 bar.

6. The method of claim 4, wherein said fluorine containing gas is injected commencing at about 4 bar.

7. The method of claim 6, wherein said fluorine containing gas is maintained in said blank at a pressure of about 10 bar.

8. The method of claim 7, wherein said fluorine containing gas is maintained at said pressure of about 10 bar for about 30 seconds.

9. The method of claim 8, wherein said step of injecting said fluorine containing gas into said expanded blank is followed by an additional step of venting said fluorine containing gas from said expanded blank.

10. The method of claim 9, wherein said venting is followed by repeated rinsings of said blank with inert gas.

11. The method of claim 10, wherein said blank comprises polyethylene.

12. The method of claim 11, wherein said step of injecting said fluorine containing gas into said blank results in a surface therein of fluorinated polyethylene.

13. The method of claim 12, wherein said fluorine containing gas comprises less than about 1.5% of fluorine.

14. The method of claim 13, wherein said fluorine containing gas comprises nitrogen.

15. The method of claim 14, wherein said injected inert gas comprises air.

16. The method of claim 14, wherein said injected inert gas comprises pure nitrogen.

17. The method of claim 16, wherein said container comprises an automotive fuel tank.

18. The method of claim 1, wherein said steps are carried out in about 120 seconds.

19. The method of claim 3, wherein said step of checking is carried out at a pressure within said expanded blank of about 3 bar.

20. The method of claim 13, wherein said fluorine containing gas comprises about 1% of fluorine.

* * * * *